June 3, 1952   J. P. SPAHR ET AL   2,599,207
METAL PLATE ROTARY FASTENER
Filed July 7, 1950
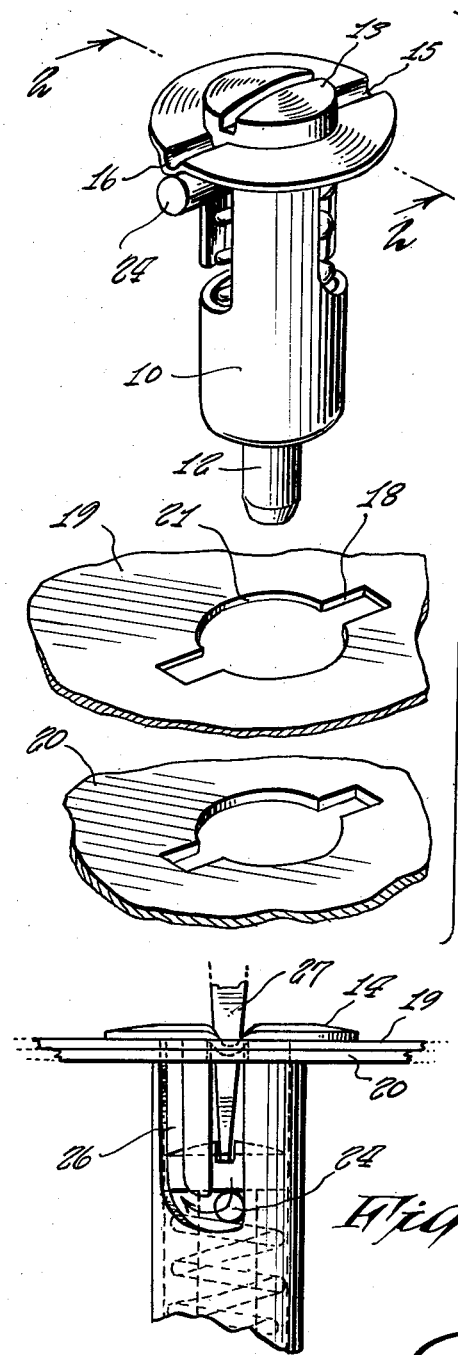
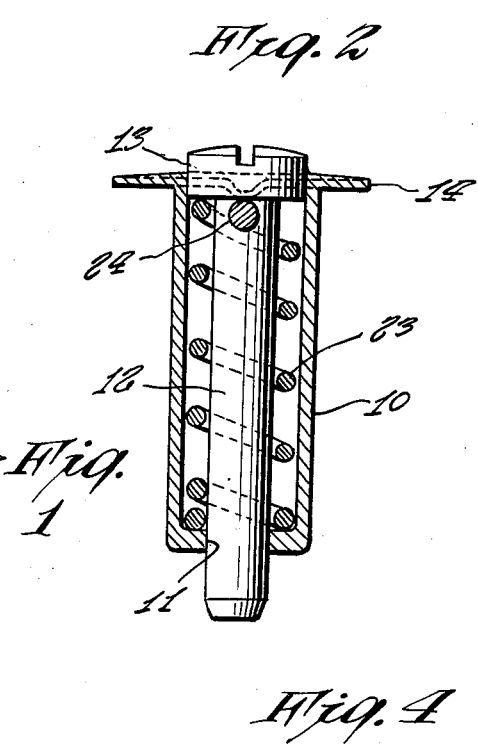
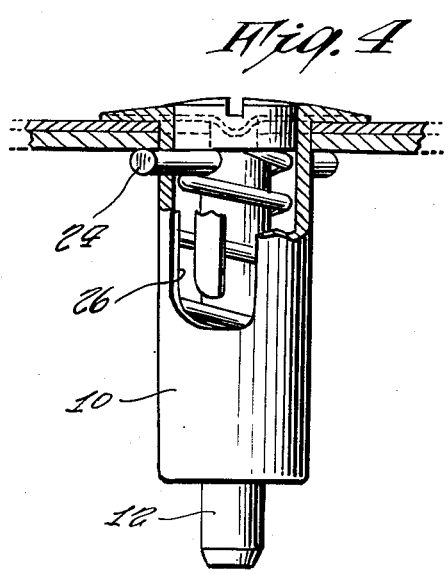
INVENTORS
JOHN P. SPAHR &
ARTHUR CAJOWSKI
BY
Carl Miller
ATTORNEY Patented June 3, 1952

2,599,207

UNITED STATES PATENT OFFICE 2,599,207

METAL PLATE ROTARY FASTENER

John P. Spahr, Astoria, and Arthur Cajowski, Floral Park, N. Y.

Application July 7, 1950, Serial No. 172,462

1 Claim. (Cl. 24—221)

This invention relates to a metal plate button device.

It is an object of the present invention to provide a metal plate button device particularly adapted for use in connecting together the plates of aircraft parts so that they can be released one from the other which is easy to apply and which can be released only with the application of a tool upon the parts and wherein the parts of the device are locked against turning relative to one another and relative to the metal plate being secured together.

Other objects of the present invention are to provide a button device for connecting together metal plates which is of simple construction, inexpensive to manufacture, easy to apply, compact, has a minimum number of parts and efficient in operation.

For other objects and for a better understanding of the invention, reference may be had to the following detailed description taken in connection with the accompanying drawing, in which Fig. 1 is a collective and perspective view of the device and of the parts of metal having the openings therein into which the device can be extended for the purpose of locking the metal pieces together.

Fig. 2 is a vertical sectional view of the device taken on line 2—2 of Fig. 1.

Fig. 3 is a fragmentary side elevational view of the device and looking in to the retaining slot with the parts inside depressed with a screw driver and in the process of being turned to release the device from the metal plates.

Fig. 4 is a fragmentary sectional view of the device connected to the metal plates with portions being broken away to show the arrangement of the parts in engagement with the metal plates.

Referring now to the figures, 10 represents the outer sleeve part having an opening 11 in the bottom end thereof through which is slidable a pin 12 which has a screw head 13 thereon. The cylinder 10 has a dropped flange 14 with depressed radially extending grooves 15 and 16 adapted to enter radially extending notches 18 of the metal plate pieces 19 and 20 which are to be connected together and which extend from round circular openings 21 respectively.

A spring of the heavy duty type 23 surrounds the shaft 12 and is contained within the sleeve 10. The pin 12 has a transverse bar 24 adapted to travel in diagonally disposed recesses 26. This bar 24 can be pushed downwardly when a screw driver 27 is connected to the screw head 13 in such a manner as to push the shaft 12 against the action of spring 23 and upon the shaft being turned with the transverse bar 24, the bar can be located in either side of the slot 26 whereby to either engage with the grooved or depressed portions 15 and 16 in the notches 18 of the plates or to be brought to bear against the under plate while the flange 14 of the sleeve part 10 holds the sleeve part against the front plate.

When the bar 24 is against the depressed portions 15 and 16, the device can be removed. When the bar is forced downwardly by the screw driver 27 and moved into the other side of the slot 26 and against the plates, the device secures the plates together.

While various changes may be made in the detail construction, it shall be understood that such changes shall be within the spirit and scope of the present invention as defined by the appended claim.

Having thus set forth and disclosed the nature of our invention, what is claimed is:

A button device for retaining metal parts together comprising a sleeve part having a top flange and an opening in the bottom end, a shaft having a screw head portion adjustable in the sleeve part, a spring urging the outward displacement of the shaft from the sleeve part, a bar extending through the shaft and radially outwardly from the sides thereof, said sleeve part having two pairs of axially disposed slots extending from the flange downwardly and radially spaced apart from each other and a pair of horizontally disposed slots, each connecting the lower ends of the said adjacent axially disposed slots, thereby forming two U-channel bars in its turning movement for engagement with the metal parts being retained by the device, said flange having radially extending depressed portions adapted to enter notches in the metal plates being secured together whereby to prevent the rotating movement or adjustment of the sleeve part, said bar in the shaft travelling in one of the said pairs of axially disposed slots and engaging the depressed portions to prevent the rotation of the shaft and travelling in the other of said axially disposed slots to effect the insertion of the device into openings of the metal plates and the removal of the device therefrom.

JOHN P. SPAHR.
ARTHUR CAJOWSKI.

REFERENCES CITED

The following references are of record in the file of this patent:

UNITED STATES PATENTS

| Number | Name | Date |
|---|---|---|
| 2,216,385 | Chobert | Oct. 1, 1940 |
| 2,252,286 | Hathorn | Aug. 12, 1941 |
| 2,318,840 | Del Camp | May 11, 1943 |
| 2,373,722 | Von Opel | Apr. 17, 1945 |

FOREIGN PATENTS

| Number | Country | Date |
|---|---|---|
| 359,190 | Great Britain | of 1931 |